US012771879B2

(12) United States Patent
Giladi

(10) Patent No.: US 12,771,879 B2
(45) Date of Patent: Oct. 20, 2026

(54) SYSTEMS AND METHODS FOR GENERATING DIFFERENTIAL HEADER DATA

(71) Applicant: Comcast Cable Communications, LLC, Philadelphia, PA (US)

(72) Inventor: Alexander Giladi, Denver, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 78 days.

(21) Appl. No.: 18/767,863

(22) Filed: Jul. 9, 2024

(65) Prior Publication Data

US 2025/0024083 A1 Jan. 16, 2025

Related U.S. Application Data

(60) Provisional application No. 63/512,786, filed on Jul. 10, 2023.

(51) Int. Cl.

| | |
|---|---|
| ***H04N 19/70*** | (2014.01) |
| ***H04N 19/136*** | (2014.01) |
| *H04N 19/169* | (2014.01) |
| *H04N 19/174* | (2014.01) |

(52) U.S. Cl.

CPC ........... *H04N 19/70* (2014.11); *H04N 19/136* (2014.11); *H04N 19/174* (2014.11); *H04N 19/188* (2014.11)

(58) Field of Classification Search

CPC .... H04N 19/70; H04N 19/136; H04N 19/174; H04N 19/188; H04L 65/70; H04L 65/762; H04L 69/04; H04L 69/22

See application file for complete search history.

(56) References Cited

U.S. PATENT DOCUMENTS

2001/0030963 A1* 10/2001 Yoshimura .............. H04L 69/16 370/468
2006/0133485 A1 6/2006 Park et al.
2006/0215648 A1* 9/2006 Jen .......................... H04L 65/70 370/389
2017/0251226 A1 8/2017 Kusakabe et al.
2018/0288500 A1* 10/2018 Stockhammer .... H04N 21/8456
2020/0112472 A1* 4/2020 Fonseca De Oliveira .................. H04L 65/80

* cited by examiner

*Primary Examiner* — Maria E Vazquez Colon
(74) *Attorney, Agent, or Firm* — BakerHostetler

(57) ABSTRACT

Methods and systems for generating differential header data are disclosed. First header data associated with a first fragment of a content item may be determined. Second header data associated with a second fragment of the content item may be determined. The first fragment of the content item may precede the second fragment of the content item. Based on comparing the first header data to the second header data, at least one difference between the first header data and the second header data may be determined. Based on the at least one difference between the first header data and the second header data, differential header data associated with the second fragment may be determined. The second fragment may be encoded. The encoded second fragment may comprise a header that comprises the differential header data.

20 Claims, 9 Drawing Sheets

SYSTEMS AND METHODS FOR GENERATING DIFFERENTIAL HEADER DATA

CROSS-REFERENCE TO RELATED APPLICATIONS

This application claims the benefit of U.S. provisional Application No. 63/512,786, filed Jul. 10, 2023, which is incorporated by reference in its entirety.

BACKGROUND

A content item may be divided into a plurality of fragments. Each of the fragments may comprise a large header. Such large headers may cause significant overhead for the content provider responsible for distributing the content item. The overhead may become increasingly problematic with shorter fragment duration and/or lower bitrates. Therefore, overhead reduction techniques are desirable.

SUMMARY

Methods and systems for overhead reduction are disclosed. A content item may be divided into a plurality of fragments. Each of the plurality of fragments may comprise a relatively large (e.g., 300-400 bytes) header. The first header of a first fragment may comprise first header data. The second header of a second, subsequent fragment may comprise second header data. The first header data and the second header data may be highly redundant. For example, the difference(s) between the first header data and the second header data may be minimal, such as timestamp and sample sizes. Differential header data associated with the second fragment may be determined. The differential header data associated with the second fragment may comprise the portion of the second header data that is not also contained in the first header data. The differential header may comprise instructions on the sequence of edit operations (including but not limited to byte insertion, removal or replacement) transforming the first header into a precise copy of the second header. The differential header data associated with the second fragment may be associated with a smaller byte size than the second header data. As such, encoding the second fragment based on the differential header data, instead of based on the second header data, may reduce the overhead that would otherwise be caused by the large header of the second fragment.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

Additional advantages will be set forth in part in the description which follows or may be learned by practice. It is to be understood that both the foregoing general description and the following detailed description are exemplary and explanatory only and are not restrictive.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION OF ILLUSTRATIVE EMBODIMENTS

Figure 1:
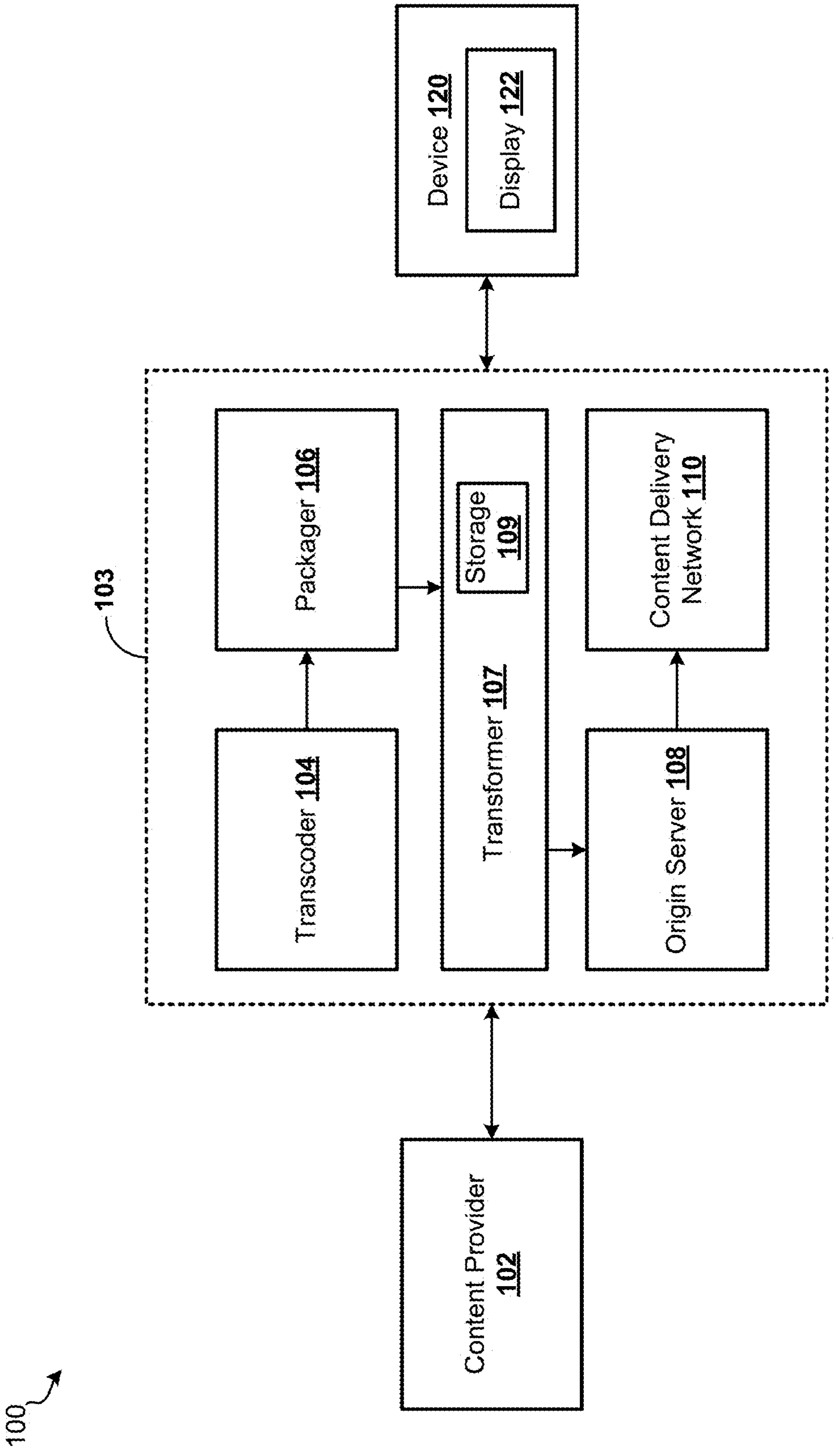
FIG. 1 is an example system.

Methods and systems for overhead are disclosed. Common Media Application Format (CMAF) is a standardized format that may be used for the encoding and packaging of segmented content for delivery and decoding on client devices (e.g., playback devices). The standardized format provides a set of containers and standards for streaming video-on-demand and linear content using the HTTP Live Streaming (HLS) protocol and the Dynamic Adaptive Streaming over HTTP (MPEG DASH, ISO/IEC 23009-1) protocol. These are commonly used with ISO Base Media File Format (ISO-BMFF) (ISO/IEC 14496-12) segments complying with Common Media Application Format (CMAF). To stream content using ISO-BMFF segments (e.g., CMAF), the content may be sent in segments to the client device(s). Each of the segments may be associated with a particular duration (e.g., one second, two seconds, three seconds, etc.). This segment duration may cause a delay between the transmission of the segment sand output (e.g., playback) of the segments via the client device, as each of the segments have to be encoded, delivered, downloaded, buffered, and then rendered by client device.

To reduce such latency, each segment can be split up into a plurality of smaller fragments (e.g., ISO-BMFF fragments, CMAF chunks). By splitting up each segment into a plurality of fragments, a client device may be able to request delivery of all available fragments of an incomplete segment, without needing to wait for the entire segment to become available for delivery. As such, splitting up each segment into a plurality of fragments may greatly reduce latency.

However, each of the plurality of fragments may comprise relatively large (e.g., 300-400 bytes) headers. For example, a fragment may comprise container (e.g., file format) level headers (e.g., "styp", "moof" and "prft" boxes) and/or bitstream (e.g., system) level headers (e.g., Sequence Parameter Set (SPS), Picture Parameter Set (PPS), and certain supplemental enhancement information (SEI) messages in video codecs such as Advanced Video Coding (AVC) (ITU-T Rec. H.264), High Efficiency Video Coding (HEVC) (ITU-T Rec. H.265), and Versatile Video Coding (VVC) (ITU-T Rec. H.266)). The combined size of such headers may cause significant overhead for the content provider responsible for distributing the fragments to client devices. Such overhead may increasingly become a problem if the duration of the fragments is reduced and/or at lower bitrates. For example, a low-latency content item that is divided into 100 millisecond (ms) fragments may be associated with a total overhead of about 96K bits per second (e.g., audio and video), which may comprise about 50% of a multichannel audio bitrate. The overhead increases as fragments become shorter, and thus may drastically increase if the fragments only comprise a single frame of the content item (which may be as short as 16 ms for video and as short as 20 ms for audio). As such, techniques for reducing this overhead are desirable.

Described here are techniques for reducing the overhead caused by large fragment headers. The data contained in the headers of consecutive fragments of the same segment may be very similar. To reduce the overhead caused by large fragment headers, only the differences between a first header of a first fragment and a second header of a second fragment may be coded into the second header. The first fragment may be a fragment that precedes (e.g., immediately precedes) the second fragment. By encoding only the differences between the first header and the second header and instructions to transform the first header into the second header, the size of the second header may be greatly reduced.

FIG. 1 is an example system 100 for distributing content. The system 100 may comprise a content provider 102, a device 120, and a plurality of system components 103 including a transcoder 104, a packager 106, a transformer 107, an origin server 108, and a content delivery network 110. The content provider 102 may be configured to send (e.g., distribute) one or more content items (e.g., assets) to the device 120 for playback (e.g., output, display) by the device 120.

The content provider 102 may comprise a cable television provider, a streaming service, a multichannel video programming distributor, a multiple system operator, or any other type of service provider. The content item may comprise one or more of linear content, non-linear content, video content, audio content, multi-media content, recorded content, stored content, or any other form of content a user may wish to consume. Video content may refer generally to any video content produced for viewer consumption regardless of the type, format, genre, or delivery method. Video content may comprise video content produced for broadcast via over-the-air radio, cable, satellite, or the internet. Video content may comprise live, pre-recorded live or on-demand content distributed using ISO-BMFF using protocols such as various versions of the HTTP (HLS or DASH) or other protocols such as QUIC, FLUTE, ROUTE, or MMT. Video content may comprise a movie, a television show or program, an episodic or serial television series, or a documentary series, such as a nature documentary series. The content item may comprise a song, a television show, a live broadcast, a movie, a podcast, an audio book, or any other type of content a user may wish to consume.

The content provider 102 may be configured to receive a content item. The content provider 102 may be configured to divide the content item into a plurality of segments. Each of the plurality of segments may comprise a segment of a particular duration (e.g., two-second fragments, ten-second fragments, or any other fixed or variable time fragments). The content provider 102 may be configured to divide each of the plurality of segments into a plurality of fragments (e.g., (e.g., ISO-BMFF fragments, CMAF chunks), such as using the packager 106. Each of the plurality of fragments may comprise a fragment of a particular duration (e.g., 16 ms, 500 ms fragments, one second fragments, or any other fixed or variable time fragments). The content provider 102 may alternatively be configured to receive the content item after it has already been divided into the plurality of segments and/or the plurality of fragments.

Figure 2:
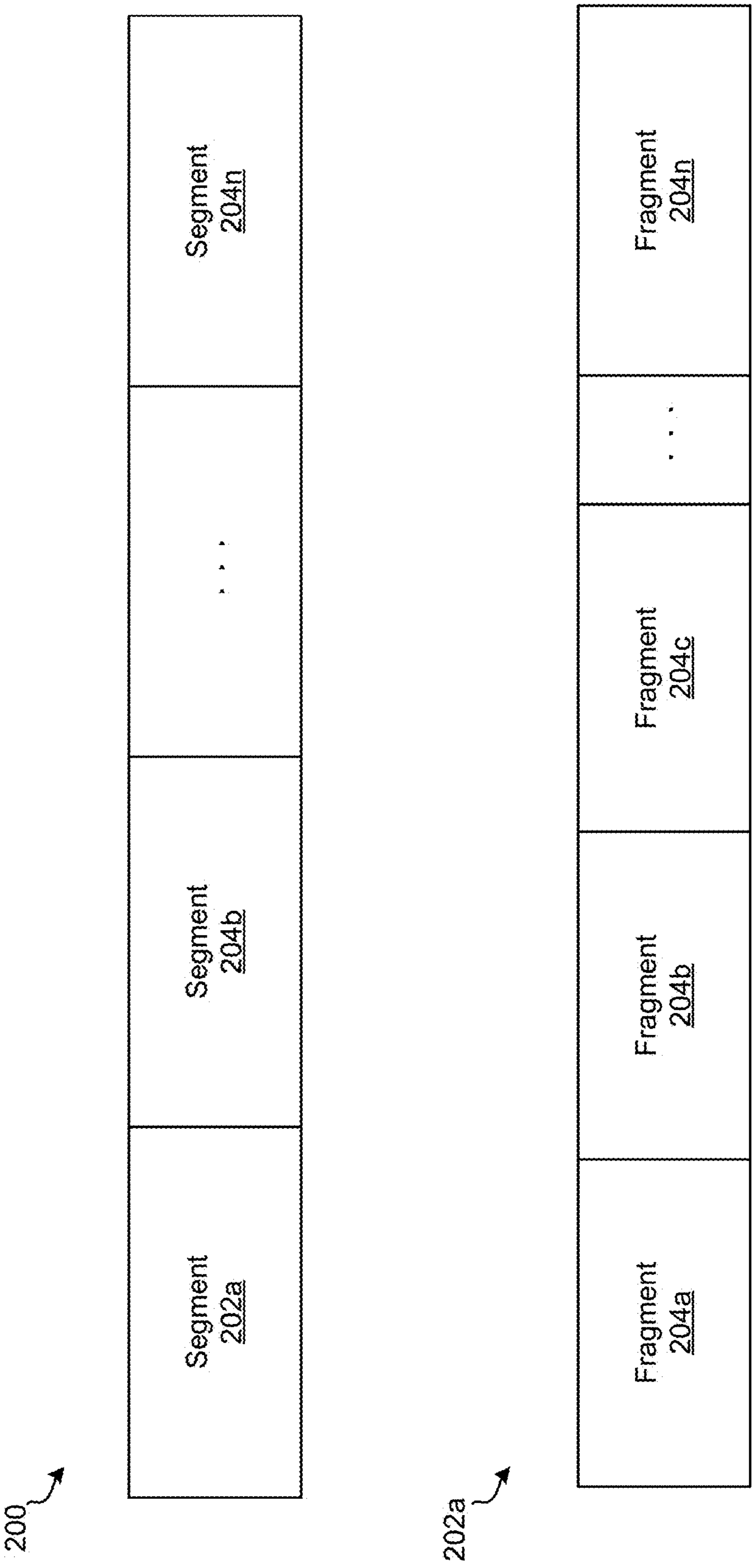
FIG. 2 is an example content item.

FIG. 2 is an example content item 200. The content item 200 may be divided into a plurality of segments 202*a-n*. Each of the plurality of segments may comprise a segment of a particular duration (e.g., two-second fragments, ten-second fragments, or any other fixed or variable time fragments). The content provider 102 may divide the content item 200 into the plurality of segments 202*a-n*. Each of the plurality of segments 202*a-n* may be divided into a plurality of fragments. For example, the segment 202*a* may be divided into a plurality of fragments 204*a-n*. Each of the remaining segments 202*b-n* may similarly be divided into a plurality of fragments. Each of the plurality of fragments may comprise a fragment of a particular duration (e.g., 500 millisecond fragments, one second fragments, or any other fixed or variable time fragments). The content provider 102 may divide each of the plurality of segments 202*a-n* into a plurality of fragments.

Referring back to FIG. 1, each of the plurality of fragments may comprise one or more headers. The header(s) may comprise container (e.g., file format) level headers and/or bitstream (e.g., system) level headers. The container level headers may comprise container level header data. The container level header data may comprise the data contained in (e.g., indicated by) at least one of a segment type (styp) box associated with the fragment, a producer reference time (prft) box associated with the fragment, event message (emsg) box(es) associated with the fragment, or a movie fragment (moof) box associated with the fragment. The bitstream level headers may comprise bitstream level header data. For video compression standards such as AVC, HEVC, or VVC, the bitstream level header data may comprise at least one of non-video coding layer (VCL) network abstraction layer (NAL) data associated with the fragment or slice header data associated with the fragment, such as SPS, PPS, and SEI messages, as well as slice headers.

Figure 3:
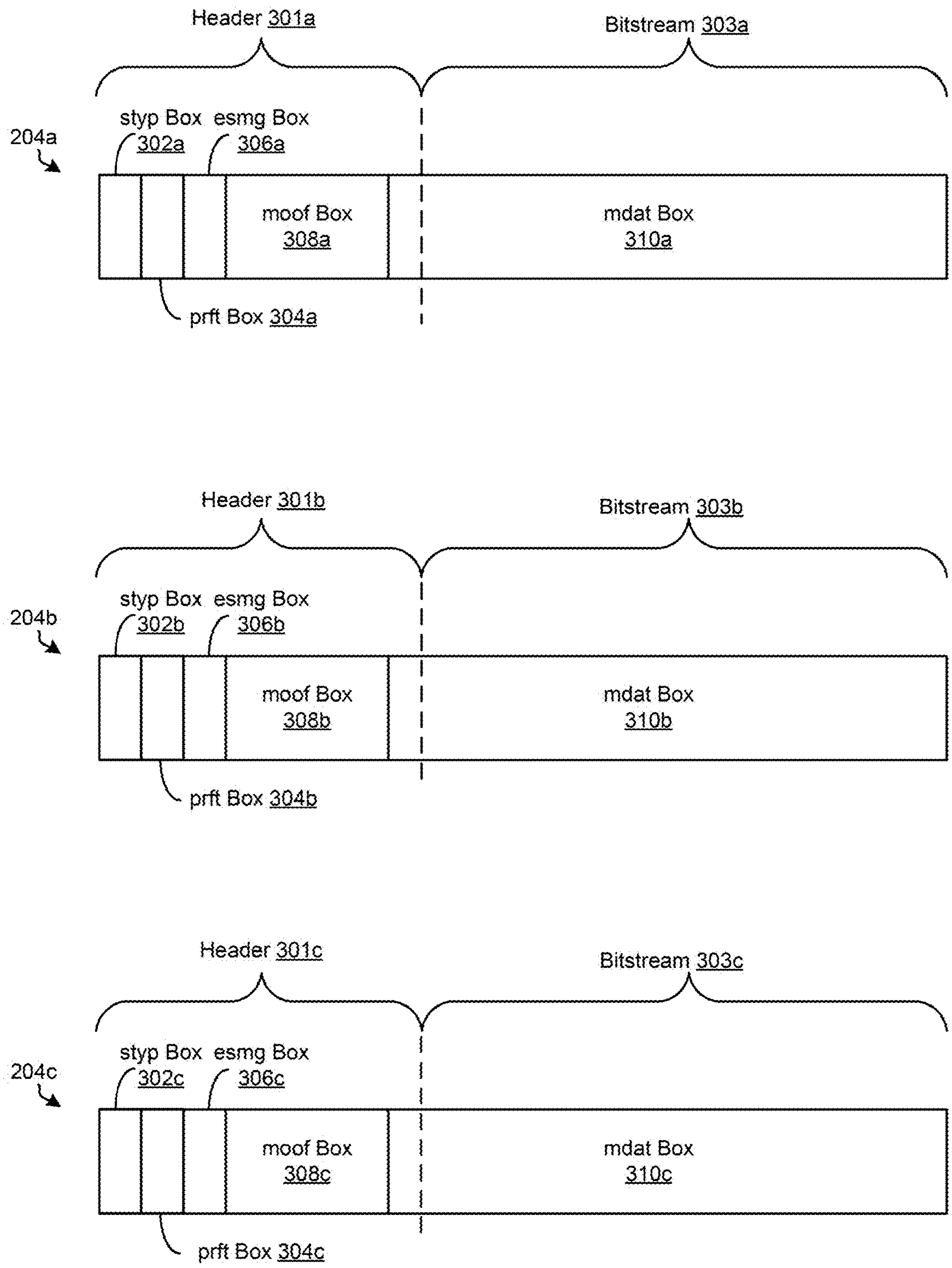
FIG. 3 is an example set of headers.

FIG. 3 is an example set of fragment headers. As discussed above with regard to FIG. 2, the segment 202*a* may be divided into a plurality of fragments 204*a-n*. Each of the plurality of fragments 204*a-n* may comprise a header. For example, the fragment 204*a* may comprise the header 301*a*, the fragment 204*b* may comprise the header 301*b*, the fragment 204*c* may comprise the header 301*c*, and so on.

Each of the headers 301*a-c* may be container level headers. Each of the headers 301*a-c* may comprise a corresponding styp box 302*a-c* associated with the corresponding fragment. The styp boxes 302*a-c* may comprise data (e.g., information) indicating a type of media segments (e.g., audio, video, or text) associated with the corresponding fragment. The styp boxes 302*a-c* may comprise data (e.g., information) indicating the version of the codecs used. The data contained in the styp boxes 302*a-c* may be used by client devices, such as by the device 120, to understand the format of the corresponding fragment and to decode the fragment correctly. Each of the headers 301*a-c* may comprise a corresponding moof box 308*a-c* associated with the corresponding fragment. The moof boxes 308*a-c* may comprise metadata associated with the corresponding fragment. If the content item is a linear content item, each of the headers 301*a-c* may comprise a corresponding prft box 304*a-c*. The prft boxes 304*a-c* may comprise data indicating times corresponding to the production of the corresponding fragment. If the content item is a linear content item, each of the headers 301*a-c* may comprise a corresponding emsg box 306*a-c*. The emsg boxes 306*a-c* may comprise data (e.g., information) indicating in-band media timed events associated with the corresponding fragment, such as Society of Cable and Telecommunications (SCTE) 35 cue messages, callback, or media presentation description (MPD) Validity Expiration events. Each of the headers 301*a-c* may optionally comprise a first portion (e.g., a beginning portion) of a corresponding media data (mdat) box 310*a-c* associated with the corresponding fragment. The mdat boxes 310*a-c* may comprise the audio and/or video associated with the corresponding fragment.

The remainder of each of the plurality of fragments 204*a-n* may comprise a bitstream. For example, the fragment 204*a* may comprise a bitstream 303*a*. The bitstream 303*a* may comprise the portion of the fragment 204*a* that does not comprise the header 301*a*. The fragment 204*b* may comprise a bitstream 303*b*. The bitstream 303*b* may comprise the portion of the fragment 204*b* that does not comprise the header 301*b*. The fragment 204*c* may comprise a bitstream 303*c*. The bitstream 303*c* may comprise the portion of the fragment 204*c* that does not comprise the header 301*c*. Each of the bitstreams 303*a-c* may comprise at least a portion of the corresponding mdat box 310*a-c*. For example, each of the bitstreams 303*a-c* may comprise a second (e.g., remaining) portion of the corresponding mdat box 310*a-c* if the headers 301*a-c* comprise the first portion (e.g., the beginning portion) of the corresponding mdat box 310*a-c*. If the headers 301*a-c* do not comprise any portion of the corresponding mdat box 310*a-c*, each of the bitstreams 303*a-c* may comprise the entire corresponding mdat box 310*a-c*.

Figure 4:
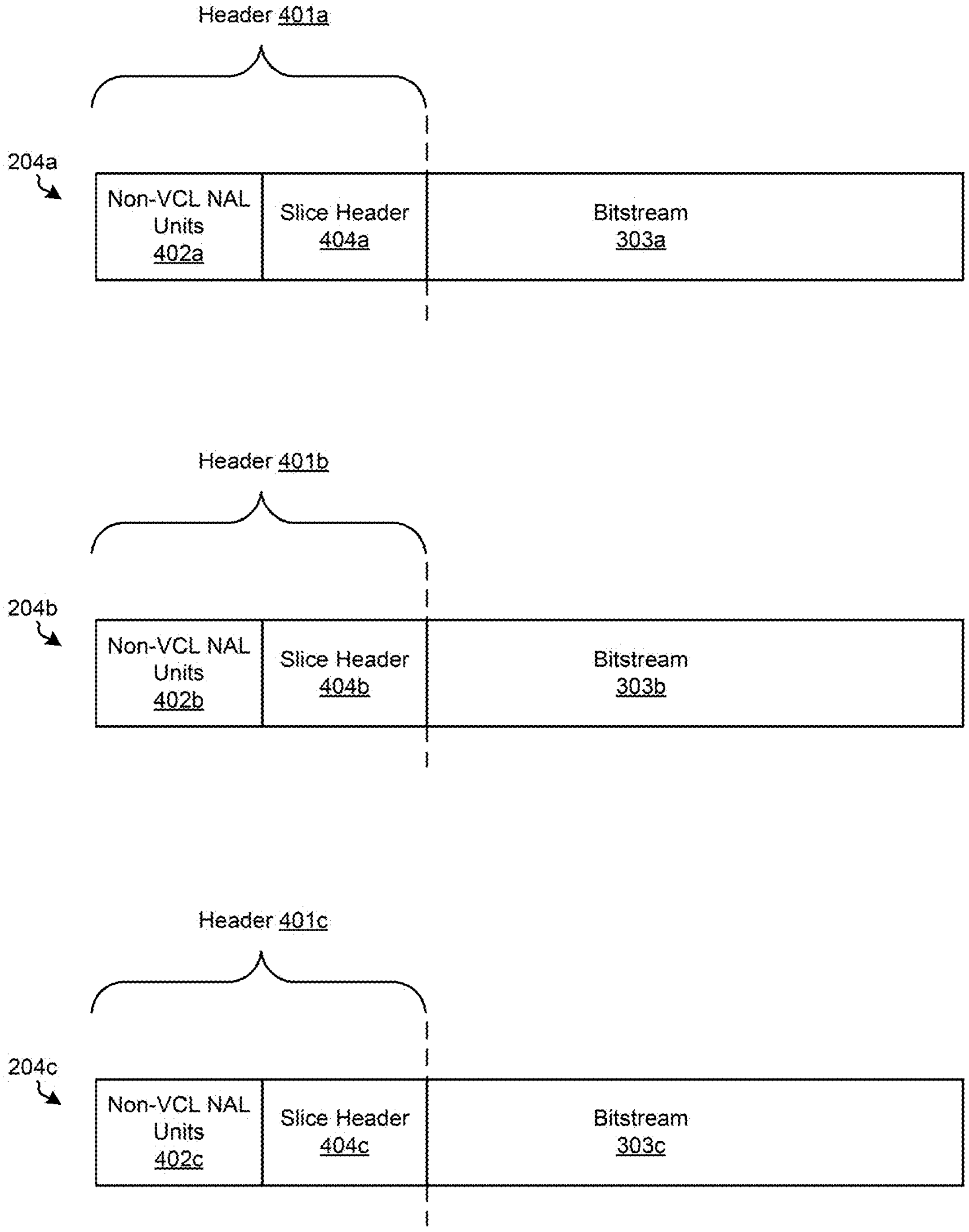
FIG. 4 is an example set of headers.

FIG. 4 is another example set of fragment headers. As discussed above with regard to FIG. 2, the segment 202*a* may be divided into a plurality of fragments 204*a-n*. Each of the plurality of fragments 204*a-n* may comprise a header. For example, the fragment 204*a* may comprise the header 401*a*, the fragment 204*b* may comprise the header 401*b*, the fragment 204*c* may comprise the header 401*c*, and so on.

Each of the headers 301*a-c* may be bitstream level headers. Each of the headers 401*a-c* may comprise corresponding non-VCL NAL units 402*a-c*. The non-VCL NAL units 402*a-c* may comprise data indicating sequence and picture information associated with the corresponding fragment. The non-VCL NAL data may comprise the beginning of the mdat box (e.g., the string "mdat" may be included in the header data). Each of the headers 401*a-c* may comprise a corresponding slice header 404*a-c*. The slice headers 404*a-c* may comprise data indicating a slice type (e.g., I, B, or P), a resolution (e.g., for VVC), top left coordinates of the slice, PPS id, information about QP, picture timing, etc.

As described above with regard to FIG. 2, the remainder of each of the plurality of fragments 204*a-n* may comprise a bitstream. For example, the fragment 204*a* may comprise a bitstream 303*a*. The bitstream 303*a* may comprise the portion of the fragment 204*a* that does not comprise the header 401*a*. The fragment 204*b* may comprise a bitstream 303*b*. The bitstream 303*b* may comprise the portion of the fragment 204*b* that does not comprise the header 401*b*. The fragment 204*c* may comprise a bitstream 303*c*. The bitstream 303*c* may comprise the portion of the fragment 204*c* that does not comprise the header 401*c*.

Referring back to FIG. 1, the content provider 102 may send the content item fragments to the transcoder 104. The transcoder 104 may comprise an encoder. The transcoder 104 may receive the content item from the content provider 102. The transcoder 104 may be configured to transcode the content item. The transcoder 104 may be configured to generate frames (e.g., video frames) of the content item. The frames may comprise a single picture, or audio frame (e.g., 1024 samples at 48 KHz sampling rate). The transcoder 104 may be configured to transcode the content item by decoding the content item to an intermediate uncompressed format, and then encoding the decoded content item into a target content format. The target video format may comprise a video format that is compatible with output of the content item via the device 120.

The transcoder 104 may transmit the transcoded content item to a packager 106. The packager 106 may receive the transcoded content item from the transcoder 104. The packager 106 may be configured to divide each of the plurality of segments into the plurality of fragments (e.g., (e.g., ISO-BMFF fragments, CMAF chunks). The packager 106 may reshape the transcoded content item fragments so that they are suitable to reach viewers and their many devices. For example, a number of representations may need to be created for each transcoded content item fragment. Each of the representations may be associated with a different resolution to accommodate varying screen sizes and different bitrates to match available bandwidth. Then each of these many representations may be prepared or "packaged" for each adaptive bitrate streaming format, such as Apple HLS, Microsoft Smooth Streaming, Adobe HDS, and/or MPEG DASH, and/or a combination thereof.

The packager 106 may be configured to generate a manifest file associated with the content item. The manifest file may contain information describing various aspects of the associated content item that may be useful for the device 120 to playback the content item and/or for the content provider 102 to store and retrieve the program. For example, the manifest file may indicate each of the plurality of segments and/or the plurality of content fragments, the playback duration of each segment and/or fragment, the number of segments and/or fragments, and/or the proper ordering of the segments and/or fragments necessary to effectuate a playback of the content item. The manifest file may comprise a network location (e.g., a hyper-text transfer protocol (HTTP) uniform resource locator (URL) link or other universal resource identifier (URI)) for each segment and/or fragment from which the segment and/or fragment may be downloaded, accessed, or retrieved. The network locations included within the manifest file may point to more than one different location or source. The manifest file may be provided to the device 120 in response to a request to receive a program. The device 120 may use the manifest file to determine the segments and/or fragments required to cause output (e.g., playback, display) of the content item or a portion of the content item and subsequently download the required fragments using the network locations specified in the manifest file.

The packager 106 may transmit the packaged content item fragments to the transformer 107. The transformer 107 may receive a packaged content item fragment (e.g., CMAF chunk), such as from the packager 106. The received fragment may be associated with a particular (e.g., first) content item segment. The received fragment may be the initial (e.g., first, beginning) fragment of the first content item segment. Based on (e.g., in response to) receiving the fragment, the transformer 107 may determine that the fragment is the initial fragment of the first content item segment. Based on (e.g., in response to) determining that the initial fragment is the initial fragment of the first content item segment, the transformer 107 may clear (e.g., reset, erase) a memory (e.g., storage 109) of the transformer 107.

The transformer 107 may store the initial fragment as a reference fragment associated with the first content item segment in the storage 109. Based on (e.g., in response to, after) the transformer 107 storing the initial fragment as the reference fragment associated with the first content item segment in the storage 109, the transformer 107 may send the initial fragment to the origin server 108. For example, the transformer 107 may send the initial fragment to the origin server 108 as an uncompressed fragment or an independently compressed fragment.

The transformer 107 may receive another packaged content item fragment (e.g., first fragment, first CMAF chunk), such as from the packager 106. The first fragment may be associated with the first content item segment. The initial fragment may precede the first fragment in the first content item segment. For example, the initial fragment may immediately precede the first fragment in the first content item segment. Based on (e.g., in response to) receiving the first fragment, the transformer 107 may determine that the first fragment is not the initial fragment of the first content item segment. Based on (e.g., in response to) determining that the first fragment is not the initial fragment of the first content item segment, the transformer 107 may retrieve the reference fragment associated with the first content item segment from the storage 109.

The transformer 107 may be configured to determine (e.g., calculate, generate) differential header data associate with the first fragment. The transformer 107 may be configured to determine (e.g., calculate, generate) differential header data associate with the first fragment based on (e.g., using) the initial fragment as the reference fragment.

To determine the differential header data associated with the first fragment, the transformer 107 may determine header data associated with the initial fragment. To determine the header data associated with the initial fragment, the transformer 107 may determine a last byte of a header of the initial fragment. The transformer 107 may further determine first header data associated with the first fragment. To determine the first header data, the transformer 107 may determine a last byte of a header of the first fragment.

The transformer 107 may compare the header data associated with the initial fragment to the first header data. Based on the comparison, the transformer 107 may determine at least one difference between the header data associated with the initial fragment and the first header data. As described above, the data contained in the headers of consecutive fragments of the same segment may be very similar. Thus, the at least one difference between the header data associated with the initial fragment and the first header data may be minimal in size relative to the large size (e.g., 300 byte) of the first header data.

To reduce the overhead caused by large headers, only the differences between the header data associated with the initial fragment and the first header and/or instructions on sequence of edit operations (e.g., byte insertion, removal or replacement) for transforming the initial header into a precise copy of the first header may be coded into the header of the first fragment. The transformer 107 may generate differential header data associated with the first fragment. The transformer 107 may generate the differential header data associated with the first fragment based on the at least one difference between the header data associated with the initial fragment and the first header data. The differential header data associated with the first fragment may comprise the data included in the first header data but not included in the header data associated with the initial fragment. The differential header data associated with the first fragment may not comprise any of the data included in both the header data associated with the initial fragment and the first header data. Thus, the differential header data associated with the first fragment may be associated with a smaller byte size than the first header data. The transformer 107 may generate a binary patch (e.g., inter-fragment binary patch) associated with the first fragment. The binary patch associated with the first fragment may be indicative of or comprise data indicative of the differential header data associated with the first fragment.

Figure 5:
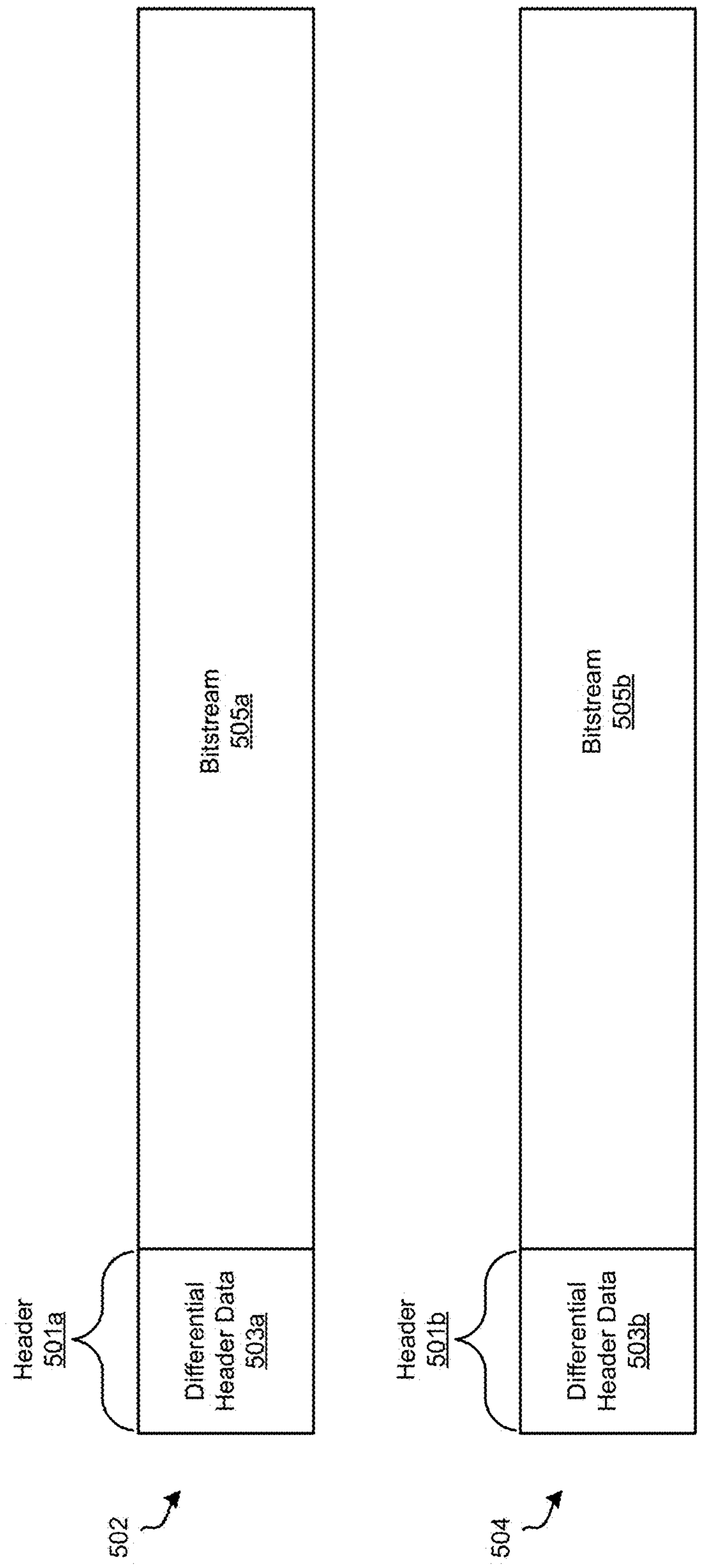
FIG. 5 is an example encoded content item fragment.

The transformer 107 may encode the first fragment. The transformer 107 may encode the first fragment based on the differential header data associated with the first fragment. For example, the encoded first fragment may comprise a first differential header. The first differential header may comprise the differential header data associated with the first fragment. Encoding the first fragment may comprise compressing the differential header data associated with the first fragment and the bitstream associated with the first fragment. FIG. 5 shows an example encoded first fragment 502. The encoded first fragment 502 comprises a header 501*a* and a bitstream 505*a*. The header 501*a* may compromise differential header data 503*a*. The start of the encoded first fragment may carry the binary patch associated with the first fragment, encoded in a format such as VCDIFF, UPS, or IPS. The binary patch may be further compressed using any suitable lossless compression algorithm, such as gzip and/or Brotli.

The transformer 107 may optionally update the reference fragment associated with the first content item segment. The transformer 107 may update the reference fragment associated with the first content item segment based on (e.g., in response to) generating the differential header data associated with the first fragment and/or based on (e.g., in response to) encoding the first fragment. The transformer 107 may update the reference fragment associated with the first content item segment by storing the first fragment as the as the reference fragment associated with the first content item segment in the storage 109.

The transformer 107 may send the encoded first fragment to the origin server 108. The transformer 107 may send the encoded first fragment to the origin server 108 based on (e.g., in response to, after) the transformer 107 storing the first fragment as the updated reference fragment associated with the first content item segment in the storage 109.

The transformer 107 may receive another packaged content item fragment (e.g., second fragment, second CMAF chunk), such as from the packager 106. The second fragment may be associated with the first content item segment. The first fragment may precede the second fragment in the first content item segment. For example, the first fragment may immediately precede the second fragment in the first content item segment. Based on (e.g., in response to) receiving the second fragment, the transformer 107 may determine that the second fragment is not the initial fragment of the first content item segment. Based on (e.g., in response to) determining that the second fragment is not the initial fragment of the first content item segment, the transformer 107 may retrieve the reference fragment associated with the first content item segment from the storage 109. As described above, the reference fragment associated with the first content item segment may be the initial fragment of the first content item segment. The reference fragment may alternatively be the first fragment of the first content item (if the transformer 107 updated the reference fragment).

The transformer 107 may be configured to determine (e.g., calculate, generate) differential header data associate with the second fragment. The transformer 107 may be configured to determine (e.g., calculate, generate) differential header data associate with the second fragment based on (e.g., using) the first fragment as the reference fragment.

To determine the differential header data associated with the second fragment, the transformer 107 may determine first header data associated with the first fragment. To determine the first header data associated with the first fragment, the transformer 107 may determine a last byte of a header of the first fragment. The transformer 107 may further determine second header data associated with the second fragment. To determine the second header data, the transformer 107 may determine a last byte of a header of the second fragment.

The transformer 107 may compare the first header data to the second header data. Based on the comparison, the transformer 107 may determine at least one difference between the first header data and the second header data. As described above, the data contained in the headers of consecutive fragments of the same segment may be very similar. Thus, the at least one difference between the first header data and the second header data may be minimal in size relative to the large size (e.g., 300 byte) of the second header data.

To reduce the overhead caused by large headers, only the differences between the header data associated with the first fragment and the second header and/or instructions on sequence of edit operations (e.g., byte insertion, removal or replacement) for transforming the first header into a precise copy of the second header may be coded into the header of the second fragment. The transformer 107 may generate differential header data associated with the second fragment. The transformer 107 may generate the differential header data associated with the second fragment based on the at least one difference between the first header data and the second header data. The differential header data associated with the second fragment may comprise the data included in the second header data but not included in the first header data. The differential header data associated with the second fragment may not comprise any of the data included in both the first header data and the second header data. Thus, the differential header data associated with the second fragment may be associated with a smaller byte size than the second header data. The transformer 107 may generate a binary patch (e.g., inter-fragment binary patch) associated with the second fragment. The binary patch associated with the second fragment may be indicative of or comprise data indicative of the differential header data associated with the second fragment.

The transformer 107 may encode the second fragment. The transformer 107 may encode the second fragment based on the differential header data associated with the second fragment. For example, the encoded second fragment may comprise a second differential header. The second differential header may comprise the differential header data associated with the second fragment. Encoding the second fragment may comprise compressing the differential header data associated with the second fragment and the bitstream associated with the second fragment. FIG. 5 shows an example encoded second fragment 504. The encoded second fragment 504 comprises a header 501*b* and a bitstream 505*b*. The header 501*b* may compromise differential header data 503*b*. The start of the encoded second fragment may carry the binary patch associated with the second fragment, such as in a VCDIFF format. The binary patch associated with the second fragment may be further compressed using any suitable lossless compression algorithm, such as gzip and/or Brotli.

The transformer 107 may optionally further update the reference fragment associated with the first content item segment. The transformer 107 may further update the reference fragment associated with the first content item segment based on (e.g., in response to) generating the differential header data associated with the second fragment and/or based on (e.g., in response to) encoding the second fragment. The transformer 107 may further update the reference fragment associated with the first content item segment by storing the second fragment as the further updated reference fragment associated with the first content item segment in the storage 109.

The transformer 107 may send the encoded second fragment to the origin server 108. The transformer 107 may send the encoded second fragment to the origin server 108 based on (e.g., in response to, after) the transformer 107 storing the second fragment as the further updated reference fragment associated with the first content item segment in the storage 109.

The transformer 107 may repeat the above-described process for any additional fragments of the first content item segment that the transformer receives, such that only the differences between the header data associated with a received fragment and the header data associated with the reference fragment (e.g., the initial fragment or the immediately preceding fragment) may be coded into the header of the received fragment. Instructions on sequence of edit operations (e.g., byte insertion, removal or replacement) for transforming the reference header into a precise copy of the header of each received fragment may additionally be coded into the header of each received fragment.

The transformer 107 may further repeat the above-described process for each received fragment belonging to any additional segments of the content item, such as for a second content item segment, a third content item segment, etc.

The origin server 108 may receive the fragments from the transformer 107. For example, the origin server 108 may receive the uncompressed or independent compressed initial fragment from the transformer 107. The origin server 108 may receive the first encoded fragment, the second encoded fragment, and any other encoded fragments of the first content item segment. The origin server 108 may be configured to receive and fulfill a request from the device 120, via the content delivery network 110, to deliver the fragments to the device 120 for playback. The request from the device 120 to deliver the fragments may comprise identifications of the user (e.g., an account identifier, a username and/or a password), the device 120, the requested fragment (s), and/or a playback time point or temporal location. Upon receiving a request to deliver the content item to the device 120, the origin server 108 may provide one or more manifest files to the device 120 via the content delivery network 110 that describe the content item, and the segments and fragments of the content item, including network locations from which each fragment may be downloaded. Using the manifest file, the device 120 may iteratively download and begin playback of fragments of the content item.

The device 120 may be at least one of a set-top box, a streaming video player, a laptop, a television, a smartphone, a tablet, a desktop computer, or any other device capable of presenting content to a user. The user may interact with the content provider 102 via a user interface associated with the device 120 in order to request a content item from the content provider 102 and to otherwise interact with the content item. The device 120 may comprise any combination of a hardware element, such as a set-top cable box, or a software element, such as a web browser or other software adapted to playback video. The device 120 may comprise a display 122 for displaying content to a user of the device 120. It is understood that the display may be part of the device 120, such as in the example that the device 120 is a tablet, or may be located externally to the device, such as in the example that the device 120 is a set-top box and the display 122 is a television set connected to the set-top box.

Figure 6:
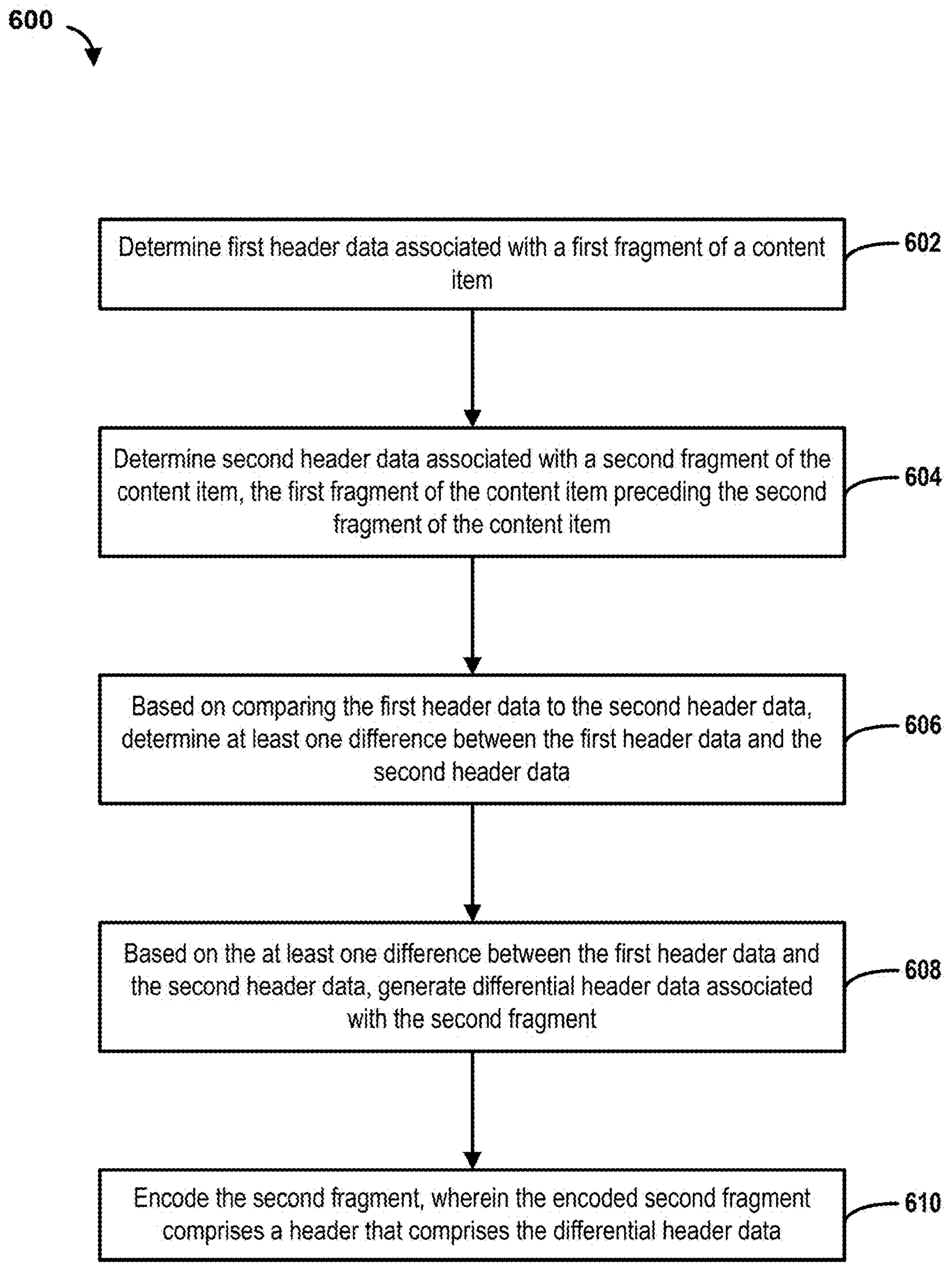
FIG. 6 is an example method.

FIG. 6 is a flow diagram illustrating an example method 600. The method 400 may comprise a computer implemented method for generating differential header data. A system and/or computing environment, such as the system 100 of FIG. 1 and/or the computing environment of FIG. 9, may be configured to perform the method 600. For example, the transformer 107 of FIG. 1 may be configured to perform the method 600.

At 602, first header data may be determined. The first header data may be associated with a first fragment (e.g., first CMAF chunk) of a content item. The first fragment of the content item may be a fragment of a segment of the content item. The first fragment of the content item may be the initial (e.g., first, beginning) fragment of the segment. To determine the first header data associated with the first fragment, a last byte of a header of the first fragment may be determined.

The first header data may comprise container level header data. If the first header data comprises container level header data, the first header data may comprise data indicated by at least one of a segment type (styp) box associated with the first fragment, a producer reference time (prft) box associated with the first fragment, an event message (emsg) box associated with the first fragment, or a movie fragment (moof) box associated with the first fragment. The first header data may additionally, or alternatively, comprise bitstream level header data. If the first header data comprises bitstream level header data, the first header data may comprise at least one of non-VCL NAL data associated with the first fragment or slice header data associated with a first slice of the first fragment. The non-VCL NAL data may comprise the beginning of the mdat box (e.g., the string "mdat" may be included in the first header data)

At 604, second header data may be determined. The second header data may be associated with a second fragment (e.g., second CMAF chunk) of the content item. The first fragment of the content item and the second fragment of the content item may be a fragment of the same segment of the content item. The first fragment of the content item may precede the second fragment of the content item. For example, the first fragment of the content item may immediately precede the second fragment of the content item. To determine the second header data associated with the second fragment, a last byte of a header of the second fragment may be determined.

The second header data may comprise container level header data. If the second header data comprises container level header data, the second header data may comprise data indicated by at least one of a segment type (styp) box associated with the second fragment, a producer reference time (prft) box associated with the second fragment, an event message (emsg) box associated with the second fragment, or a movie fragment (moof) box associated with the second fragment. The second header data may additionally, or alternatively, comprise bitstream level header data. If the second header data comprises bitstream level header data, the second header data may comprise at least one of non-VCL NAL data associated with the second fragment or slice header data associated with a first slice of the second fragment. The non-VCL NAL data may comprise the beginning of the mdat box (e.g., the string "mdat" may be included in the second header data)

At 606, at least one difference between the first header data and the second header data may be determined. The at least one difference between the first header data and the second header data may be determined based on comparing the first header data to the second header data. As described above, the data contained in the headers of fragments of the same segment may be very similar. Thus, the at least one difference between the first header data and the second header data may be minimal in size relative to the large size (e.g., 300 byte) of the second header data.

To reduce the overhead caused by large headers, the differences between the header data associated with the first fragment and the second header may be coded into the header of the second fragment. Additionally, instructions on sequence of edit operations (e.g., byte insertion, removal or replacement) for transforming the first header data into a precise copy of the second header data may be coded into the header of the second fragment. At 608, differential header data associated with the second fragment may be generated. The differential header data associated with the second fragment may be generated based on the at least one difference between the first header data and the second header data. The differential header data associated with the second fragment may comprise the data included in the second header data but not included in the first header data. The differential header data associated with the second fragment may not comprise any of the data included in both the first header data and the second header data. Thus, the differential header data associated with the second fragment may be associated with a smaller byte size than the second header data. The differential header data associated with the second fragment may comprise data indicating the instructions on sequence of edit operations (e.g., byte insertion, removal or replacement) for transforming the first header data into a precise copy of the second header data. A binary patch (e.g., inter-fragment binary patch) associated with the second fragment may be generated. The binary patch associated with the second fragment may be indicative of or comprise data indicative of the differential header data associated with the second fragment.

At 610, the second fragment may be encoded. The second fragment may be encoded based on the differential header data associated with the second fragment. The encoded second fragment may comprise a header that comprises the differential header data associated with the second fragment. Encoding the second fragment may comprise compressing the differential header data associated with the second fragment and the bitstream associated with the second fragment. The start of the encoded second fragment may carry the binary patch associated with the second fragment, such as in a VCDIFF format. The binary patch associated with the second fragment may be further compressed using any suitable lossless compression algorithm, such as gzip and/or Brotli.

Figure 7:
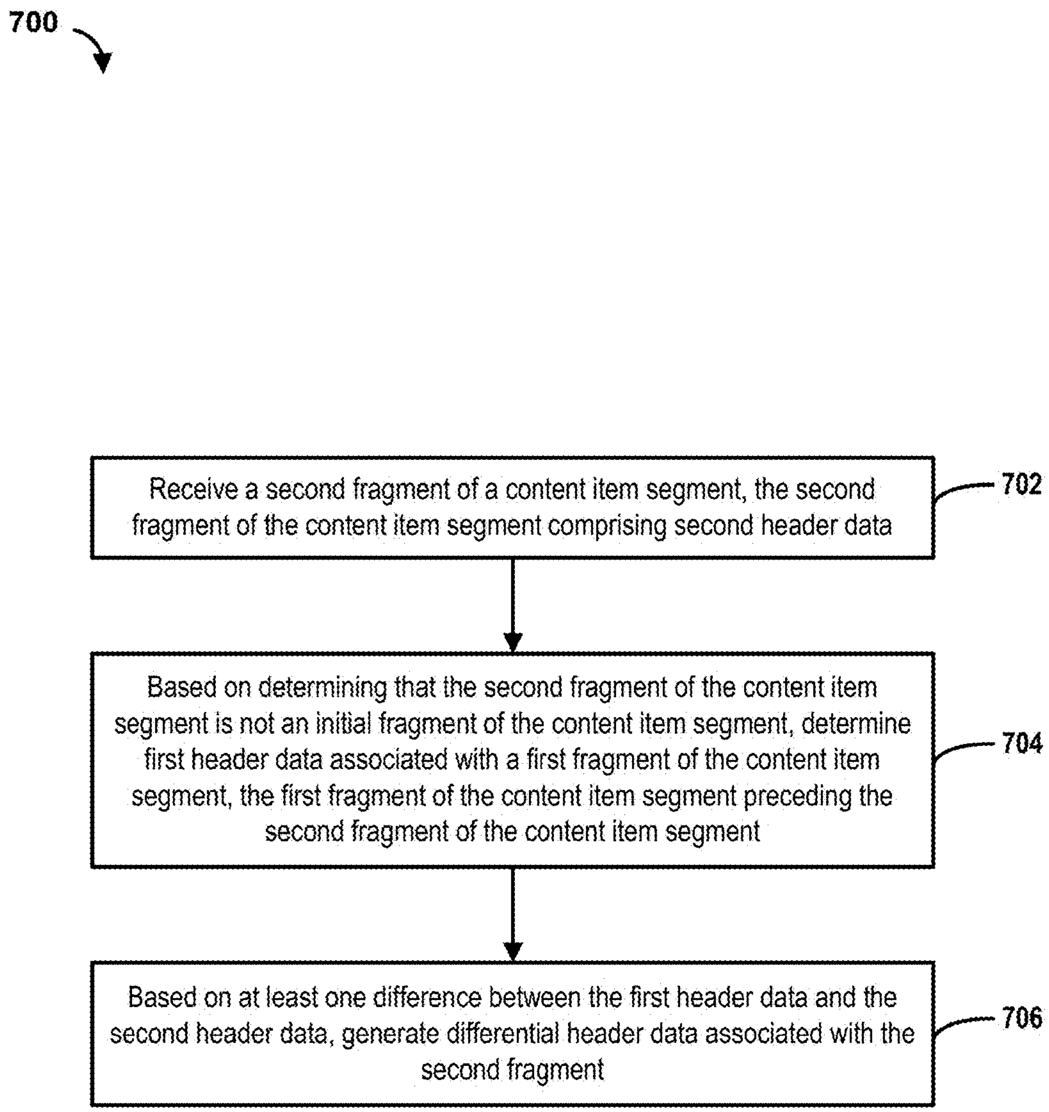
FIG. 7 is an example method.

FIG. 7 is a flow diagram illustrating an example method 700. The method 700 may comprise a computer implemented method for generating differential header data. A system and/or computing environment, such as the system 100 of FIG. 1 and/or the computing environment of FIG. 9, may be configured to perform the method 700. For example, the transformer 107 of FIG. 1 may be configured to perform the method 700.

At 702, a second fragment (e.g., second CMAF chunk) of a content item segment may be received. The second fragment of the content item segment may comprise second header data. The second header data may comprise container level header data. If the second header data comprises container level header data, the second header data may comprise data indicated by at least one of a segment type (styp) box associated with the second fragment, a producer reference time (prft) box associated with the second fragment, an event message (emsg) box associated with the second fragment, or a movie fragment (moof) box associated with the second fragment. The second header data may additionally, or alternatively, comprise bitstream level header data. If the second header data comprises bitstream level header data, the second header data may comprise at least one of non-VCL NAL data associated with the second fragment or slice header data associated with a first slice of the second fragment. The non-VCL NAL data may comprise the beginning of the mdat box (e.g., the string "mdat" may be included in the second header data)

At 704, first header data may be determined. The first header data may be associated with a first fragment of the content item. The first fragment of the content item segment may precede the second fragment of the content item segment. For example, the first fragment of the content item segment may be the initial fragment of the content item segment and/or the fragment that immediately precedes the second fragment of the content item segment. The first header data may be determined based on determining that the second fragment of the content item segment is not an initial fragment of the content item segment. To determine the first header data, a last byte of a header of the first fragment may be determined.

At 706, differential header data associated with the second fragment may be generated. The differential header data associated with the second fragment may be generated based on at least one difference between the first header data and the second header data. The differential header data associated with the second fragment may comprise the data included in the second header data but not included in the first header data. The differential header data associated with the second fragment may not comprise any of the data included in both the first header data and the second header data. Thus, the differential header data associated with the second fragment may be associated with a smaller byte size than the second header data. The differential header data may comprise data indicating instructions on sequence of edit operations (e.g., byte insertion, removal or replacement) for transforming the first header data into a precise copy of the second header data. A binary patch (e.g., inter-fragment binary patch) associated with the second fragment may be generated. The binary patch associated with the second fragment may be indicative of or comprise data indicative of the differential header data associated with the second fragment. The second fragment may be encoded based on the differential header data associated with the second fragment.

Figure 8:
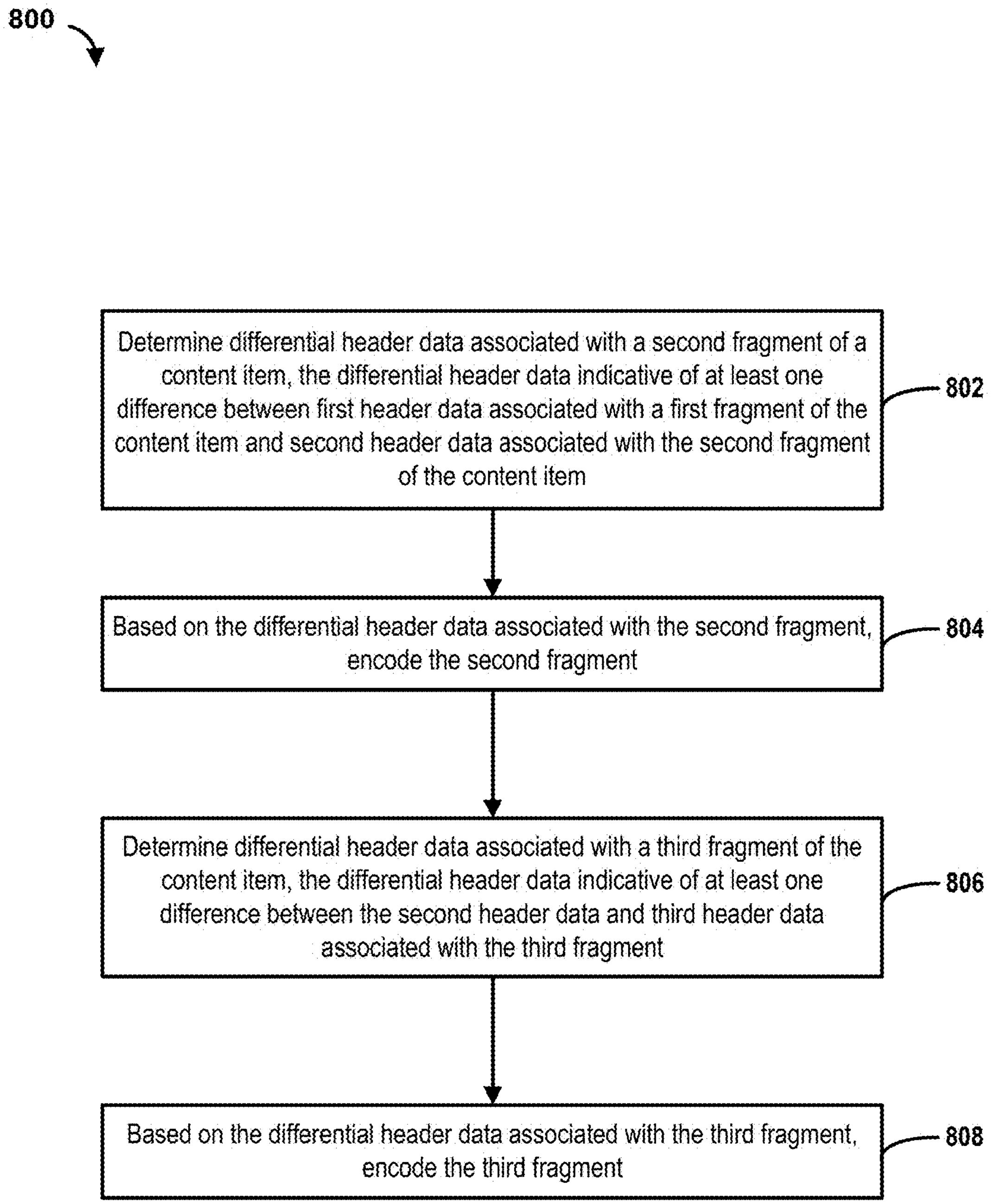
FIG. 8 is an example method.

FIG. 8 is a flow diagram illustrating an example method 800. The method 800 may comprise a computer implemented method for generating differential header data. A system and/or computing environment, such as the system 100 of FIG. 1 and/or the computing environment of FIG. 9, may be configured to perform the method 800. For example, the transformer 107 of FIG. 1 may be configured to perform the method 800.

At 802, differential header data associated with a second fragment (e.g., second CMAF chunk) of a content item may be determined. The differential header data associated with the second fragment may be generated based on at least one difference between first header data associated with a first fragment (e.g., first CMAF chunk) of the content item and second header data associated with the second fragment. The first fragment and the second fragment may belong to the same segment of the content item. The first fragment may precede the second fragment in the segment. For example, the first fragment may immediately precede the second fragment in the segment.

The differential header data associated with the second fragment may comprise the data included in the second header data but not included in the first header data. The differential header data associated with the second fragment may not comprise any of the data included in both the first header data and the second header data. Thus, the differential header data associated with the second fragment may be associated with a smaller byte size than the second header data. The differential header data may comprise data indicating instructions on sequence of edit operations (e.g., byte insertion, removal or replacement) for transforming the first header data into a precise copy of the second header data. A binary patch (e.g., inter-fragment binary patch) associated with the second fragment may be generated. The binary patch associated with the second fragment may be indicative of or comprise data indicative of the differential header data associated with the second fragment.

At 804, the second fragment may be encoded. The second fragment may be encoded based on the differential header data associated with the second fragment. The encoded second fragment may comprise a header that comprises the differential header data associated with the second fragment. Encoding the second fragment may comprise compressing the differential header data associated with the second fragment and the bitstream associated with the second fragment. The start of the encoded second fragment may carry the binary patch associated with the second fragment, such as in a VCDIFF format. The binary patch associated with the second fragment may be further compressed using any suitable lossless compression algorithm, such as gzip and/or Brotli.

At 806, differential header data associated with a third fragment of the content item may be determined. The differential header data associated with the third fragment may be generated based on at least one difference between the second header data associated with the second fragment and third header data associated with the third fragment. The second fragment and the third fragment may belong to the same segment of the content item. The second fragment may precede the third fragment in the segment. For example, the second fragment may immediately precede the third fragment in the segment The differential header data associated with the third fragment may comprise the data included in the third header data but not included in the second header data. The differential header data associated with the third fragment may not comprise any of the data included in both the second header data and the third header data. Thus, the differential header data associated with the third fragment may be associated with a smaller byte size than the third header data. A binary patch (e.g., inter-fragment binary patch) associated with the third fragment may be generated. The binary patch associated with the third fragment may be indicative of or comprise data indicative of the differential header data associated with the third fragment.

At 808, the third fragment may be encoded. The third fragment may be encoded based on the differential header data associated with the third fragment. The encoded third fragment may comprise a header that comprises the differential header data associated with the third fragment. Encoding the third fragment may comprise compressing the differential header data associated with the third fragment and the bitstream associated with the third fragment. The start of the encoded third fragment may carry the binary patch associated with the third fragment, such as in a VCDIFF format. The binary patch associated with the third fragment may be further compressed using any suitable lossless compression algorithm, such as gzip and/or Brotli.

Figure 9:
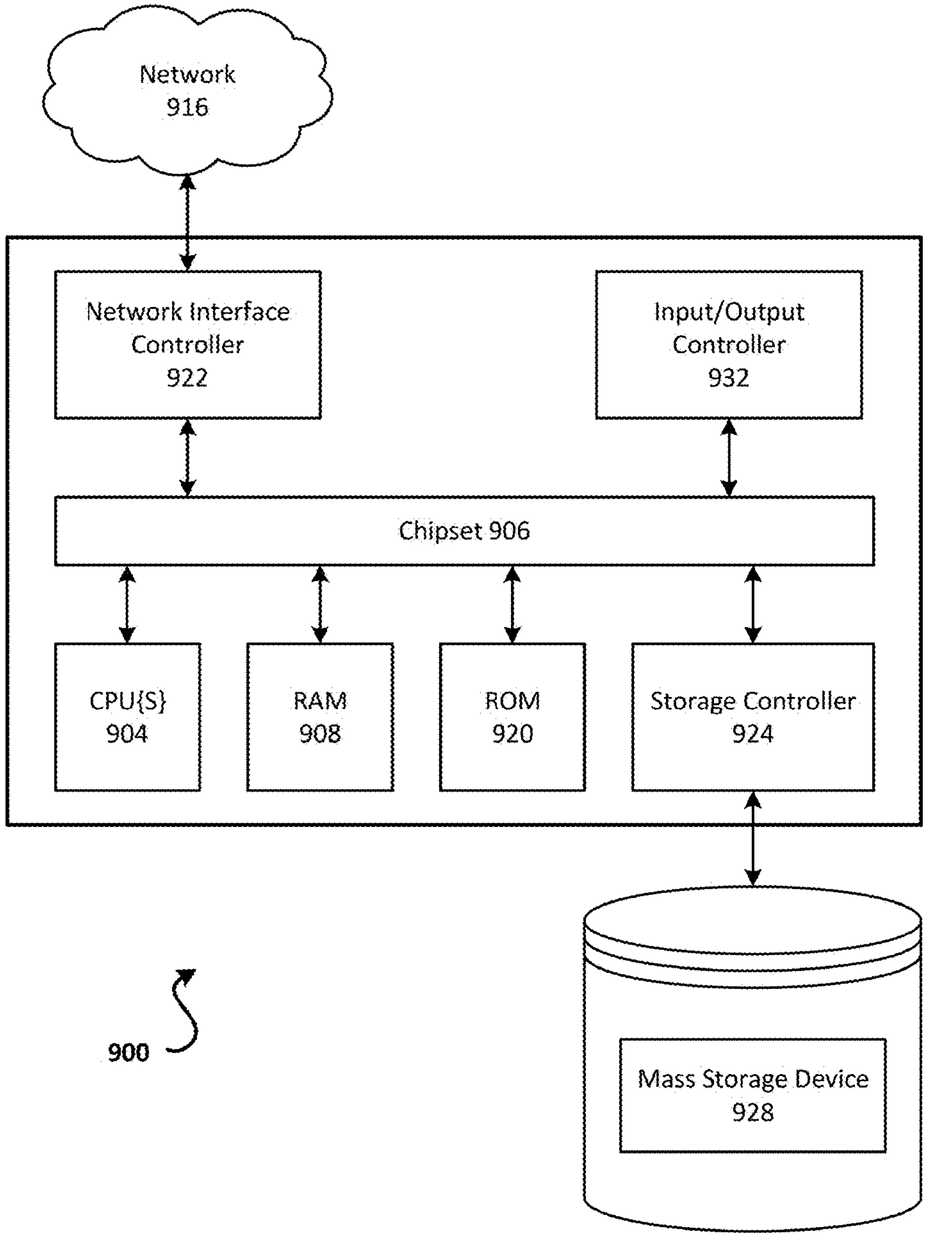
FIG. 9 is an example computing device.

FIG. 9 depicts a computing device that may be used in various aspects, such as one or more of the content provider 102, the transcoder 104, the packager 106, the transformer 107, the origin server 108, the CDN 110, and/or the device 120 depicted in FIG. 1. With regard to the example architecture of FIG. 1, any of the servers, devices, content providers, and/or affiliate content providers may each be implemented in an instance of a computing device 900 of FIG. 9.

The computer architecture shown in FIG. 9 shows a conventional server computer, workstation, desktop computer, laptop, tablet, network appliance, PDA, e-reader, digital cellular phone, or other computing node, and may be utilized to execute any aspects of the computers described herein, such as to implement the methods described in relation to FIG. 6, FIG. 7, and FIG. 8.

The computing device 900 may include a baseboard, or "motherboard," which is a printed circuit board to which a multitude of components or devices may be connected by way of a system bus or other electrical communication paths. One or more central processing units (CPUs) 904 may operate in conjunction with a chipset 906. The CPU(s) 904 may be standard programmable processors that perform arithmetic and logical operations necessary for the operation of the computing device 900.

The CPU(s) 904 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 904 may be augmented with or replaced by other processing units, such as GPU(s). The GPU(s) may comprise processing units specialized for but not necessarily limited to highly parallel computations, such as graphics and other visualization-related processing.

A chipset 906 may provide an interface between the CPU(s) 904 and the remainder of the components and devices on the baseboard. The chipset 906 may provide an interface to a random access memory (RAM) 908 used as the main memory in the computing device 900. The chipset 906 may further provide an interface to a computer-readable storage medium, such as a read-only memory (ROM) 920 or non-volatile RAM (NVRAM) (not shown), for storing basic routines that may help to start up the computing device 900 and to transfer information between the various components and devices. ROM 920 or NVRAM may also store other software components necessary for the operation of the computing device 900 in accordance with the aspects described herein.

The computing device 900 may operate in a networked environment using logical connections to remote computing nodes and computer systems through local area network (LAN) 916. The chipset 906 may include functionality for providing network connectivity through a network interface controller (NIC) 922, such as a gigabit Ethernet adapter. A NIC 922 may be capable of connecting the computing device 900 to other computing nodes over a network 916. It should be appreciated that multiple NICs 922 may be present in the computing device 900, connecting the computing device to other types of networks and remote computer systems.

The computing device 900 may be connected to a mass storage device 928 that provides non-volatile storage for the computer. The mass storage device 928 may store system programs, application programs, other program modules, and data, which have been described in greater detail herein. The mass storage device 928 may be connected to the computing device 900 through a storage controller 924 connected to the chipset 906. The mass storage device 928 may consist of one or more physical storage units. A storage controller 924 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 900 may store data on a mass storage device 928 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 928 is characterized as primary or secondary storage and the like.

For example, the computing device 900 may store information to the mass storage device 928 by issuing instructions through a storage controller 924 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 900 may further read information from the mass storage device 928 by detecting the physical states or characteristics of one or more particular locations within the physical storage units.

In addition to the mass storage device 928 described above, the computing device 900 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 900.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic citemtes, magnetic tape, magnetic disk storage, other magnetic storage devices, or any other medium that may be used to store the desired information in a non-transitory fashion.

A mass storage device, such as the mass storage device 928 depicted in FIG. 9, may store an operating system utilized to control the operation of the computing device 900. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 928 may store other system or application programs and data utilized by the computing device 900.

The mass storage device 928 or other computer-readable storage media may also be encoded with computer-executable instructions, which, when loaded into the computing device 900, transforms the computing device from a general-purpose computing system into a special-purpose computer capable of implementing the aspects described herein. These computer-executable instructions transform the computing device 900 by specifying how the CPU(s) 904 transition between states, as described above. The computing device 900 may have access to computer-readable storage media storing computer-executable instructions, which, when executed by the computing device 900, may perform the methods described in relation to FIG. 6, FIG. 7, and FIG. 8.

A computing device, such as the computing device 900 depicted in FIG. 9, may also include an input/output controller 932 for receiving and processing input from a number of input devices, such as a keyboard, a mouse, a touchpad, a touch screen, an electronic stylus, or other type of input device. Similarly, an input/output controller 932 may provide output to a display, such as a computer monitor, a flat-panel display, a digital projector, a printer, a plotter, or other type of output device. It will be appreciated that the computing device 900 may not include all of the components shown in FIG. 9, may include other components that are not explicitly shown in FIG. 9, or may utilize an architecture completely different than that shown in FIG. 9.

As described herein, a computing device may be a physical computing device, such as the computing device 900 of FIG. 9. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described herein with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, or in addition, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method comprising:

determining first header data associated with a first fragment of a content item;

determining second header data associated with a second fragment of the content item, wherein the first fragment of the content item precedes the second fragment of the content item;

based on comparing the first header data to the second header data, determining at least one difference between the first header data and the second header data;

based on the at least one difference between the first header data and the second header data, generating differential header data associated with the second fragment; and encoding the second fragment, wherein the encoded second fragment comprises a header that comprises the differential header data.

2. The method of claim 1, wherein determining the first header data associated with the first fragment of the content item comprises determining a last byte of the first fragment associated with the first header data, and wherein determining the second header data associated with the second fragment of the content item comprises determining a last byte of the second fragment associated with the second header data.

3. The method of claim 1, wherein encoding the second fragment comprises compressing the differential header data and a bitstream associated with the second fragment.

4. The method of claim 1, wherein the first fragment of the content item immediately precedes the second fragment of the content item.

5. The method of claim 1, wherein the differential header data associated with the second fragment is associated with a smaller byte size than the second header data.

6. The method of claim 1, wherein the first fragment of the content item comprises a first ISO base media file format (ISO-BMFF) fragment and the second fragment of the content item comprises a second ISO-BMFF fragment.

7. The method of claim 1, wherein the first header data comprises data indicated by at least one of a segment type (styp) box associated with the first fragment, a producer reference time (prft) box associated with the first fragment, an event message (emsg) box associated with the first fragment, or a movie fragment (moof) box associated with the first fragment, and wherein the second header data comprises data indicated by at least one of a styp box associated with the second fragment, a prft box associated with the second fragment, an emsg box associated with the second fragment, or a moof box associated with the second fragment.

8. The method of claim 1, wherein the first header data comprises at least one of non-video coding layer (VCL) network abstraction layer (NAL) data associated with the first fragment or slice header data associated with a first slice of the first fragment, and wherein the second header data comprises at least one of non-VCL NAL data associated with the second fragment or slice header data associated with a first slice of the second fragment.

9. A method comprising:

receiving a second fragment of a content item segment, wherein the second fragment of the content item segment comprises second header data;

based on determining that the second fragment of the content item segment is not an initial fragment of the content item segment, determining first header data associated with a first fragment of the content item segment, wherein the first fragment of the content item segment precedes the second fragment of the content item segment; and based on at least one difference between the first header data and the second header data, generating differential header data associated with the second fragment.

10. The method of claim 9, further comprising:

based on the differential header data, encoding the second fragment.

11. The method of claim 9, wherein the differential header data associated with the second fragment is associated with a smaller byte size than the second header data.

12. The method of claim 9, wherein the first fragment of the content item segment comprises a first ISO base media file format (ISO-BMFF) fragment and the second fragment of the content item segment comprises a second ISO-BMFF fragment.

13. The method of claim 9, wherein the first header data comprises data indicated by at least one of a segment type (styp) box associated with the first fragment, a producer reference time (prft) box associated with the first fragment, an event message (emsg) box associated with the first fragment, or a movie fragment (moof) box associated with the first fragment, and wherein the second header data comprises data indicated by at least one of a styp box associated with the second fragment, a prft box associated with the second fragment, an emsg box associated with the second fragment, or a moof box associated with the second fragment.

14. The method of claim 9, wherein the first header data comprises at least one of non-video coding layer (VCL) network abstraction layer (NAL) data associated with a first slice of the first fragment or slice header data associated with the first fragment, and wherein the second header data comprises at least one of non-VCL NAL data associated with the second fragment or slice header data associated with a first slice of the second fragment.

15. The method of claim 9, wherein the second fragment of the content item segment is received from a packager associated with a content delivery network.

16. A method comprising:

determining differential header data associated with a second fragment of a content item, wherein the differential header data associated with the second fragment of the content item is indicative of at least one difference between first header data associated with a first fragment of the content item and second header data associated with the second fragment of the content item;

based on the differential header data associated with the second fragment, encoding the second fragment;

determining differential header data associated with a third fragment of the content item, wherein the differential header data associated with the third fragment of the content item is indicative of at least one difference between the second header data and third header data associated with the third fragment of the content item; and based on the differential header data associated with the third fragment, encoding the third fragment.

17. The method of claim 16, wherein the first fragment of the content item precedes the second fragment of the content item, and wherein the second fragment of the content item precedes the third fragment of the content item.

18. The method of claim 16, wherein the differential header data associated with the second fragment is associated with a smaller byte size than the second header data, and wherein the differential header data associated with the third fragment of the content item is associated with a smaller byte size than the third header data.

19. The method of claim 16, wherein the first header data comprises data indicated by at least one of a segment type (styp) box associated with the first fragment, a producer reference time (prft) box associated with the first fragment, an event message (emsg) box associated with the first fragment, or a movie fragment (moof) box associated with the first fragment, wherein the second header data comprises data indicated by at least one of a styp box associated with the second fragment, a prft box associated with the second fragment, an emsg box associated with the second fragment, or a moof box associated with the second fragment, and wherein the third header data comprises data indicated by at least one of a styp box associated with the third fragment, a prft box associated with the third fragment, an emsg box associated with the third fragment, or a moof box associated with the third fragment.

20. The method of claim 16, wherein the first header data comprises at least one of non-video coding layer (VCL) network abstraction layer (NAL) data associated with the first fragment or slice header data associated with a first slice of the first fragment, wherein the second header data comprises at least one of non-VCL NAL data associated with the second fragment or slice header data associated with a first slice of the second fragment, and wherein the third header data comprises at least one of non-VCL NAL data associated with the third fragment or slice header data associated with a first slice of the third fragment.

* * * * *